United States Patent [19]
Gee

[11] Patent Number: 5,117,385
[45] Date of Patent: May 26, 1992

[54] TABLE LOOKUP MULTIPLIER WITH DIGITAL FILTER

[75] Inventor: Ralph L. Gee, San Jose, Calif.

[73] Assignee: International Business Machines Corporation, Armonk, N.Y.

[21] Appl. No.: 772,117

[22] Filed: Oct. 8, 1991

Related U.S. Application Data

[63] Continuation of Ser. No. 662,391, Feb. 27, 1991, abandoned, which is a continuation of Ser. No. 494,687, Mar. 16, 1990, abandoned.

[51] Int. Cl.⁵ .......................... G06F 7/52; G06F 15/31
[52] U.S. Cl. .................................. 364/757; 364/724.16
[58] Field of Search .................. 364/757, 754, 724.16, 364/724.01

[56] References Cited

U.S. PATENT DOCUMENTS

| | | | |
|---|---|---|---|
| 4,484,299 | 11/1984 | Lambourn et al. | 364/724.16 |
| 4,566,075 | 1/1986 | Guttag | 364/754 |
| 4,573,136 | 2/1986 | Rossiter | 364/757 X |
| 4,679,164 | 7/1987 | Rearick | 364/754 X |
| 4,709,343 | 11/1987 | Van Cang | 364/724.01 |
| 4,794,555 | 12/1988 | Kojima et al. | 364/724.01 |

Primary Examiner—Tan V. Mai
Attorney, Agent, or Firm—Maxham, Jester & Meador Baker

[57] ABSTRACT

In a digital multiplier for multiplying two multi-bit binary operands to produce a binary result by means of a lookup table containing all possible products of said operands, reduction of the total amount of memory required to store the table is obtained by segmenting one operand into a plurality of non-overlapping bit groups and constructing lookup tables for the bit groups, in which each lookup table contains products of its associated bit group and the other, non-partitioned operand. Multiplication is accomplished by generating partial products from the lookup tables, shifting the partial products to account for the relative significance of their associated bit groups, and adding the partial products to provide the resultant product.

5 Claims, 4 Drawing Sheets

TABLE LOOKUP MULTIPLIER WITH DIGITAL FILTER

This is a continuation of application Ser. No. 07/662,391, filed Feb. 27, 1991, now abandoned, which is a continuation of application Ser. NO. 07/494,687, filed Mar. 16, 1990, now abandoned.

BACKGROUND

The invention is in the field of machine-implemented digital filters in which filter section multiplication is performed using a lookup table (LUT). More particularly, this invention is concerned with lookup table multiplication in which operand bit grouping results in a reduction in the table size necessary to produce all possible products of two multi-bit operands by LUT multiplication.

Digital filtration is a well-known technique which is implemented by a multi-stage apparatus in which the jth stage generates a product produced by multiplying the instantaneous value of a filter input X(t) and a filter stage coefficient Kj. For example, a digital finite impulse response (FIR) filter is given by:

$$Y(t) = \sum_{j=0}^{n} K_j X(t - j) \quad (1)$$

Equation (1) represents an FIR filter with constant coefficients. The apparatus which implements the filter of equation (1) consists of N stages. At each stage, the jth coefficient $K_j$ is multiplied by $X(t-j)$ to produce a product. Y(t) is obtained by taking the sum of all of the products. The FIR filter of equation 1 is represented in transposed canonical form by the apparatus of FIG. 1. In FIG. 1, each coefficient $K_j$ is 1 bits wide; X(t) is m bits wide; the product $Y_j(t)$ of $X \times K_j$ is n bits wide, where $n = m + 1$. The final result Y(t) is the sum of the N XxK products.

If the circuit of FIG. 1 is a hard-wired filter, the multiplication function for each stage denoted by reference numeral 10 can be a high-speed binary multiplier which generates and combines a plurality of partial products for each value of X to produce $Y_j$. Such a multiplier accepts the two multi-bit operands X(t) and $K_j$ in either signed or unsigned form. One such multiplier is taught, for example, in pending U.S. Patent application Ser. No. 291,659, filed on Dec. 28, 1988, U.S. Pat. No. 4,926,371, and assigned to the assignee of this application.

Another form of hard-wired, high-speed multiplication utilizes a lookup table (LUT) in which all possible products of X(t) and $K_j$ are stored. Each product is stored at an address location corresponding to the magnitude of X which, when multiplied by $K_j$, results in the product stored at the addressed location. In LUT multiplication, the operation consists essentially of providing the instantaneous value of X at the address port of the memory in which the LUT is stored, which "reads out" the product stored at the addressed location.

The technique of LUT multiplication is very fast and its speed increases with the provision of memories which operate at video speeds. The required basic hardware component for a LUT multiplier comprises a memory and associated address circuitry. However, a substantial amount of memory is required to store all possible products of X(t) and $K_j$. In an N stage filter, the memory requirement is compounded because a LUT is required for each stage.

The simplicity and high speed of LUT multiplication makes it extremely attractive for multiple-stage sum-of-product mechanisms such as digital filters. Therefore, there is an evident need to provide a LUT multiplier which affords the desired speed, but which reduces the total amount of memory required to implement the technique.

SUMMARY OF THE INVENTION

The inventor has invented a LUT multiplication technique which achieves the desired reduction in memory requirements. The invention is based upon the inventor's critical observation that partitioning the time-varying operand X(t) into non-overlapping bit groups and constructing, for each bit group, a lookup table which stores a set of partial products resulting from multiplying $K_j$ by all possible values of the bit group substantially reduces the total memory requirements for LUT multiplication. Further reduction is obtained by eliminating redundant partial products.

The invention is realized as a method for lookup multiplication of an m-bit operand X and an 1-bit operand K to produce an n-bit product Y, wherein $n = m + 1$. The method is executable with a storage apparatus and a binary adder, and includes the following steps:

X is partitioned into i consecutive, non-overlapping bit groups, the bit groups forming X when concatenated in a particular magnitude order in which each bit group has a respective magnitude position;

a set of partial products is generated for each bit group, each partial product in the set representing the multiplication of K by a number which the bit group represents;

the sets of partial products are stored in the storage apparatus;

an instantaneous value X(t) is presented for multiplication by K;

i partial products are obtained from the storage apparatus in response to X(t), each partial product being obtained in response to a respective bit group of X(t) which corresponds to a respective one of the i consecutive, non-overlapping bit groups, and representing the product of the instantaneous value of that bit group and K;

each one of the i bit groups is shifted in a predetermined magnitude direction to form i n-bit partial products; and the i n-bit partial products are added to obtain Y.

A significant objective achieved by the prior partitioning of the K operand is to reduce the total amount of storage required to generate every possible product of X and K by lookup table multiplication.

Significantly, the invention provides for a substantial reduction in the total memory used for lookup table multiplication in an n-stage digital filter.

These objectives and other attendant advantages of this invention will be manifest when the following description is read with reference to the below-described drawings.

DETAILED DESCRIPTION OF THE PREFERRED EMBODIMENT

Figure 1:
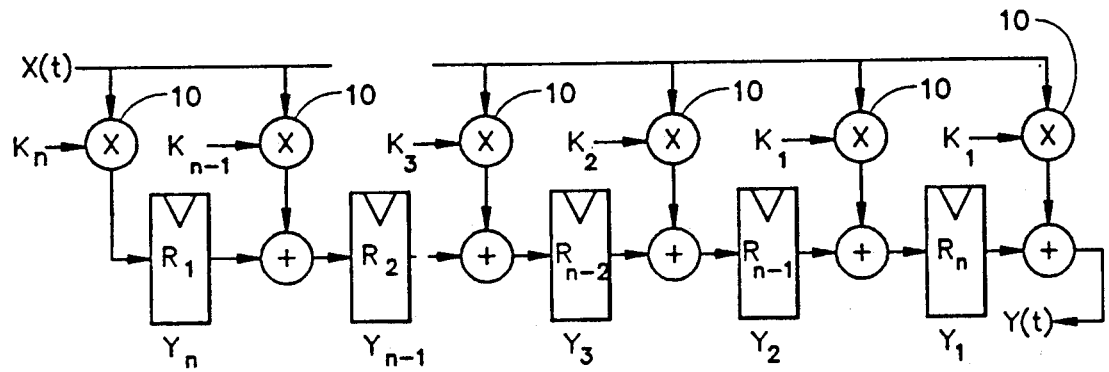
FIG. 1 is a diagrammatic illustration of a discrete, N-stage digital filter.
Figure 2:
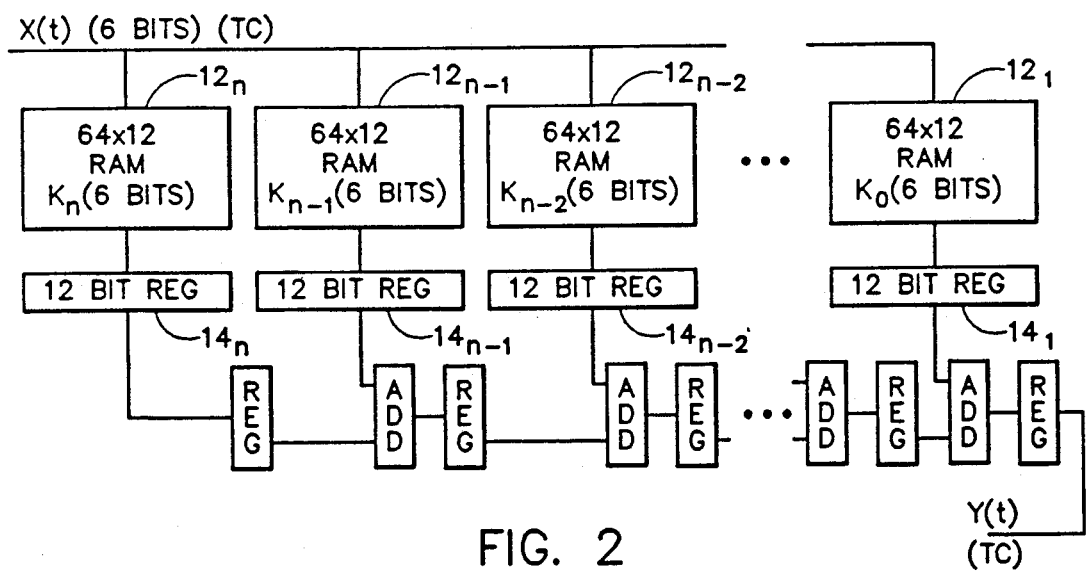
FIG. 2 is a diagrammatic illustration of the filter of FIG. 1 in which coefficient multiplication is implemented by lookup tables.

Referring first to FIG. 2, a specific implementation of the transposed filter of FIG. 1 is illustrated. In FIG. 2, it is assumed that the coefficients $K_j$ and the variable $X(t)$ are both 6-bit numbers and that LUT multiplication is employed in each stage of the transposed filter. For the jth filter stage, the products produced by multiplication of $K_j$ and all possible values of X are calculated and stored in a table.

In FIG. 2, the table for each stage is contained in a random access memory (RAM) $12_i$, where $i = 1, 2, \ldots, n$. When the instantaneous value of X changes, each stage requires a multiply which is performed by addressing the stages RAM with the current value of X, extracting the results from the RAM, and registering them in registers $14_n$–$14_l$. The table size T of each of the LUT's is a function of the number of bits in X and the number of bits in K, and is given by equation (2), wherein $$T(m,l) = 2^m x(m+l) \quad (2)$$

As equation (2) shows, there is an exponential dependence on m, the number of bits in X, and a linear dependence on 1, the number of bits in K. The total table storage requirement for the n stage filter of FIG. 2 is simply the table requirement T times N, the number of taps.

Assuming that $X(t)$ and $K_j$ are both 6 bits wide; each table requires a RAM which is $64 \times 12$ to store the 64 possible products, the largest of which will be 12 bits wide. As equation 2 demonstrates, doubling the number of bits in X more than quadruples the storage requirements of the tables. In most filter applications, the number of bits for both X and K, as well as the number of taps are set by the application requirements. Thus, applications requiring large numbers of bits in X will be forced to use an extraordinary amount of storage if prior art LUT multiplication is utilized.

THE INVENTION

When considering multiplication of two digital operands, it is asserted that the operands can be in one of two essential forms: offset binary (unsigned) or two's complement (signed). The offset binary form is given in equation (3), while the two's complement form is given in equation (4).

$$\text{Offset Binary: } X = \sum_{i=0}^{m-1} 2^i x_i \quad (3)$$

$$= 2^{m-1}x_{m-1} + 2^{m-2}x_{m-2} + \ldots + 2^2 x_2 + 2x_1 + x_0$$

where: $x_i \epsilon (0,1)$ $$\text{Two's Complement: } X = (-1)2^{m-1}x_{m-1} + \sum_{i=0}^{m-2} 2^i x_i \quad (4)$$

$$= (-1)2^{m-1}x_{m-1} + 2^{m-2}x_{m-2} + \ldots + 2^2 x_2 + 2x_1 + x_0$$

where: $x_i \epsilon (0,1)$

In equation (3), each coefficient $x_i$ is either 1 or 0, indicating the presence or absence of the particular power 2. A shortened notation for the number leaves out the powers of 2 and uses only the coefficients to represent the number, such as:

$$x_{m-1} x_{m-2} \ldots x_2 x_1 x_0$$

The coefficients are concatenated in a predetermined magnitude significance in which $x_{m-1}$ is the MSB, representing the highest power of 2, and $x_0$ is the LSB, representing the lowest power of 2.

In equation (4), the MSB is the sign bit; when 1, the number is negative, when 0, the number is positive. When X and K, in two's complement form, are multiplied together, the result is given in analytical form by equation (5).

$$K \times X = \left( (-1)2^{l-1}k_{l-1} + \sum_{j=0}^{l-2} 2^j k_j \right) \times \quad (5)$$

$$(-1)2^{m-1}x_{m-1} + \sum_{i=0}^{m-2} 2^i x_i$$

$$= \left( (-1)2^{l-1}k_{l-1} + \sum_{j=0}^{l-2} 2^j k_j \right) \times$$

$$((-1)2^{m-1}x_{m-1} + 2^{m-2}x_{m-2} + \ldots + 2^2 x_2 + 2x_1 + x_0))$$

The key to the invention described and claimed in this application is the realization that the its constituting the operand X can be partitioned selectively inv arious ways to form bit groups. The unexpected result of this groping is hat when the groups are formed and multiplied by $K_j$, the total table size required to store products for LUT multiplication shrinks.

To illustrate the reduction in table size, let X be a 10-bit number in two's complement form. The expression for the KxX multiplication is given in equation 6.

$$K \times X = Kx((-1)2^9 x_9 + 2^8 x_8 + 2^7 x_7 + \quad (6)$$
$$2^6 x_6 + 2^5 x_5 + 2^4 x_4 +$$
$$2^3 x_3 + 2^2 x_2 + 2x_1 + x_0)$$

$$= Kx(((-1)2^9 x_9 + 2^8 x_8 + 2^7 x_7) +$$
$$(2^6 x_6 + 2^5 x_5 + 2^4 x_4) +$$
$$(2^3 x_3 + 2^2 x_2 + 2x_1 + x_0))$$

$$= Kx(2^7((-1)2^2 x_9 + 2x_8 + x_7) +$$
$$(2^4(2^2 x_6 + 2x_5 + x_4 +$$
$$(2^3 x_3 + 2^2 x_2 + 2x_1 + x_0))$$

$$= 2^7 K((-1)2^2 x_9 + 2x_8 + x_7) +$$

-continued
$$2^4K(2^2x_6 - 2x_5 - x_4) - \underbrace{}_{\text{group 2}}$$
$$\underbrace{K(2^2x_3 - 2^2x_2 - 2x_1 - x_0)}_{\text{group 3}}$$

In equation (6), the 10-bit operand X has been partitioned into three separate, non-overlapping groups. Assuming that $K_j$ is also a 10-bit number, the table sizes for groups 1, 2, and 3 can be calculated according to equation (2). For groups 1 and 2 m=3, l=10, and the total table size is 104 bits. For group 3, m=4, l=10, and the table size is 224 bits. Thus, the total table size required to store all possible products according to the partition of X illustrated in equation (6), is 432 bits for two 10-bit operands. Using equation (2) for two 10-bit operands without partition will give a table size of 20,480, an increase of over 47 times the size required with partition.

Although the table size is significantly reduced, the product of X and K cannot be produced directly from the smaller tables. As seen from equation (6), several operations must be completed. First, values received from the tables for groups 1 and 2 must be properly positioned with respect to the radix of $2^o$. In this regard, the values received from the table storing group 1 products must be multiplied by $2^7$, while the group 2 products must be multiplied by $2^4$. Last, the products for all three groups must be added. As will be appreciated by those skilled in the art, multiplication by a power of 2 involves a simple shift of an operand. This can be quite easily implemented in hardware by appending zeros after the LSB of a value. This operation can be "hard-wired" at virtually no penalty in time or circuit area. The additions, however, do require time and circuit area. Thus, in the example represented by equation (6), the reduction in table size is paid for by two additional adders.

Equation (6) illustrates that significant and unexpected reduction in table size is enjoyed by partitioning the multi-bit operand X into consecutive, non-overlapping bit groups. Partitioning affords still further reduction in table size. Referring to equation (6), it is clear that the group 3 sum corresponds to the offset binary equation (3). Thus, the products of K and all other possible values of group 3 will be positive. The same can be said of the products of K and all of the possible values of group 2. However, group 1 corresponds to a signed binary equation, with a change of index.

When constructed, table 3 would include the products produced by the multiplication of all possible 4-bit unsigned binary numbers by K. Likewise, the table for group 2 would be a table of all possible products of a 3-bit unsigned binary number and K. Therefore, the group 2 table is a subset of the group 3 table, which makes the group 2 table redundant. Elimination of this redundancy will reduce the storage requirement by the group 2 amount (104) to a total of 328 bits. Thus, an already low storage requirement stemming from partition of the multi-bit X operand is decreased still further by elimination of table redundancy.

The table required for group 1 is a table of products resulting from the multiplication K by all possible 3-bit signed binary numbers. Relatedly, signed binary representation contains both positive and negative numbers, with the positive and negative numbers existing in equal proportion (if 0 is counted as positive) for a given number of bits. Thus, half of a table for group 1 corresponds to positive integers and is also a subset of the group 3 table. This means that table requirements can further be reduced by half of the amount of group 1 (52 bits) to a total of 276 bits.

Referring once again to equation (6), it is noted that the multi-bit operand X can be partitioned to produce different bit groupings than those illustrated. For example, if group 1 included two bits and groups 2 and 3 both four bits, the tables for groups 2 and 3 would both require 224 bits, and would be identical. Thus, the total storage requirement for groups 2 and 3 would still be 224, but the storage requirement for group 1 would be reduced to 48, and half of the 48 would be a subset of the 224 resulting in a total storage requirement of 248 bits. Therefore, those skilled in the art will realize that optimal partition of X will result in the lowest storage requirement.

In order to inform the skilled practitioner which grouping of bits is optimal, consider equation (7), wherein $$m = \sum_{i=1}^{G} g_i \quad (7)$$

In equation (7), X is the multiplier operand containing m bits. G is the number of bit groups into which X is partitioned, and $g_i$ is the number of bits in group i. The parameter $g_i$ is a non-negative integer, greater than 0, thereby obviating the possibility of empty groups and limiting the maximum value of G to m. The magnitude significance of each group is inversely related to the group's subscript; thus, $g_1$ is the number of bits in the MSB group, while $g_G$ is the number of bits in the LSB group. The conditions for optimality are two; and are laid out in equations 8 and 9, wherein:

$$g_1 < (m/G) + 1 \text{ for all i} \quad (8)$$

and $$g_1 > \{g_2, g_3, g_4, \ldots, g_G\} \text{ if } g_1 > \{g_2, g_3, g_3, \ldots, g_G\} \quad (9)$$

OR $$g_1 = \min(g_{1j}) \text{ if } g_1 > \{g_2, g_3, g_3, \ldots, g_G\}$$

In equation (8), the right side is generally not an integer, while the left side is always an integer. Relatedly, equation (8) simply establishes a rational upper bound for bit group size. The upper bound ensures that bits are well distributed among the groups.

The second condition is given in equation (9). In equation (9), $g_{ij}$ is the set of possible values for $g_i$, given that the upper bound of equation (8) is met. Now, if the number of bits in $g_1$ can be made greater than every other group, that is the optimal grouping; otherwise the number of bits in group 1 should be the smallest possible.

As an illustration of the application of these conditions, assume that the multiplicand operand is a 12-bit number which will be divided into 5 bit groups. Thus, m=12, G=5, and (m/G)+1=3.4. This means that the maximum group size is 3. Manifestly, if the groups are non-overlapping, each of the five groups cannot contain three bits, since this would imply an operand of 15 bits. Therefore, not all groups contain three bits. On the other hand, two bits per group implies an operand of 10, which is too small. Therefore, some groups must contain three bits, and others two bits. Inspection of equation (8) ensures that there is at least one group of maximum size, that is, three bits. Thus, the first part of equation (9) can be true if there is only one group of maximum size. Stated differently, if $g_{max}$ is the maximum size of a group as defined by equation 8, then the first part of equation (9) holds true only if equation (10) is true.

$$m = g_{max} - \sum_{i=2}^{G} g_{max} - 1 \qquad (10)$$

Continuing with the example, $g_{max}$ was determined to be three. Thus, equation (10) requires that $$3-2-2-2-2$$

must equal 12 in order for the first part of equation (9) to be used. However, the sum is eleven, requiring use of the second part of equation (9). The second part of equation (9) states that g1 should be minimized. In this example, the number of bits in group 1 can be any one of the three values 1, 2, or 3. Thus, any set of groups with $g_1$ equal to 1 is optimal. Partitioning of a 12-bit operand gives the four following optimal sets.

{1,2,3,3,3}
{1,3,2,3,3}
{1,3,3,2,3}
{1,3,3,3,2}

The tradeoff for minimization of storage requirements according to the four groupings listed above is an increase in addressing requirements. Any of the optimal storage groupings inherently require more addressing than the less than optimal grouping {2,2,3,3,3}. Thus, the most optimal partition of an operand must take into account the total complement of circuitry sources required for table storage in table addressing.

Figure 4:
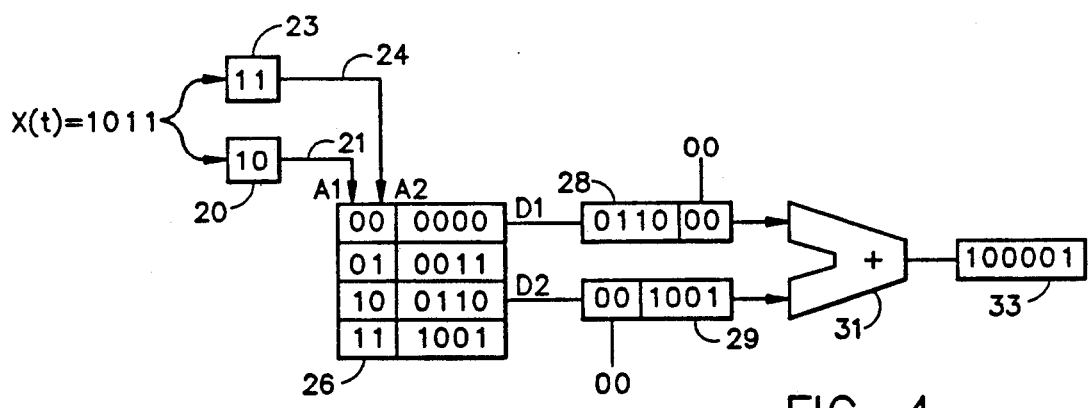
FIG. 4 illustrates a lookup table multiplier based upon the memory map of FIG. 3B.
Figures 3A, 3B, 5:
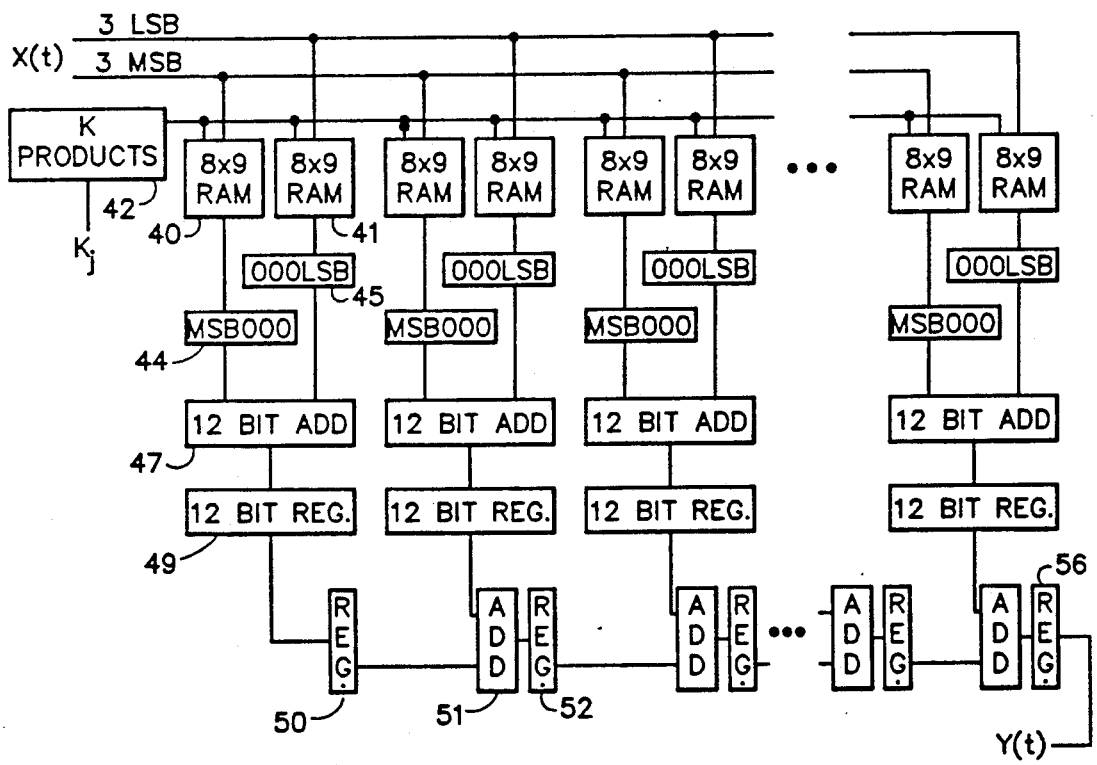
FIG. 3A is a memory map illustrating the total amount of storage capacity required in a lookup table for performing multiplication of a 4-bit operand by a 2-bit operand.
FIG. 3B is a memory map showing the total amount of storage capacity, required in two lookup tables when one operand is partitioned.
FIG. 5 is a diagrammatic illustration of the filter of FIG. 1 in which the principles of the invention have been applied to, substantially reduce the total memory required for N-stage LUT multiplication.

Refer now to FIGS. 3A, 3B and 4 for an example which illustrates diagrammatically the reduction achieved by the practice of the invention, and the basic complement of hardware needed to practice the best mode. FIGS. 3A, 3B, and 4 assume that a 4-bit operand X including bits $x_3 x_2 x_1 x_0$ will be provided for multiplication by a 2-bit operand K = 11 to produce a product Y. FIG. 3A illustrates both the total size and the map of a memory containing a lookup table composed of all of the possible products of X and K. On the left-hand side of the table are the decimal representations of all possible values of X; these also represent the addresses at which the products are stored. To the right of each address is the binary representation of the product of K and the value of X represented by the address magnitude. Thus, for example, at address 3, the binary representation of the product of 3 and 3, that is, 9, is stored. Now, multiplication of any value of X with the value of K (11) is given simply by providing X as the address to the memory which stores the table of FIG. 3A.

Consider now separation of X into two bit groups, $x_3 x_2$, and $x_1 x_0$. Lookup tables containing all possible products of those bit groups are illustrated in FIG. 3B. Thus, for example, when bit group $x_3 x_2$ has a digital value of 2, its product with K is stored at address location 2 and has a decimal value of 6. Similarly, when the bit group $x_1 x_0$ has a value (in decimal) of 3, the product of its multiplication with K is stored at address 3 and has a value (in decimal) of 9. The total memory capacity required to store the lookup tables of FIG. 3B is 32 bits.

Assuming that the tables mapped in FIG. 3B are in separate memory devices, the maps are accurate representations of the address locations of the contents. Thus, if the operand X had an instantaneous binary value of 1010 (ten, in decimal) address location 10 (2 in decimal) of each table would be activated. FIG. 3B illustrates, however, that the two tables are identical, and, therefore, redundant. Instead, a single, dual-ported memory storing a single lookup table suffices. In this instance, the reduction in memory requirement is dramatic: in FIG. 3A, a complete lookup table for a non-partitioned operand requires 96 bit spaces in 16 addressable locations. A non-redundant lookup table for a partitioned operand requires 16 bit spaces in 4 addressable locations.

The full complement of elements required to practice lookup table multiplication using a single one of the lookup tables illustrated in FIG. 3B is shown diagrammatically in FIG. 4.

In FIG. 4, the instantaneous value of X is partitioned into two, non-overlapping bit groups, each containing two bits. The MSB bit group is provided by the register 20 and signal path 21, while the LSB bit group is provided by register 23 and signal path 24. A dual-ported memory 26 contains a lookup table identical to one of the lookup table maps of FIG. 3B. The lookup table of the memory 26 includes 4 addressable locations, whose respective addresses are given in their binary form. At each addressable location, the table contains a partial product corresponding to the product of the magnitude of the location's address and the value of K (in the example, binary 11). The memory 26 is dual-ported in that it has two sets of related address and data ports A1, D1 and A2, D2. In this regard, two addresses can be presented simultaneously to the memory 26, one to each of the respective address ports. In response, the memory 26 will provide at the associated data port, the contents of the location indicated by the address at the related address port.

Each of the data ports of the memory 26 is connected to a respective one of two 6-bit registers 28 and 29. Register 28 receives, in its four most significant bit positions the table contents output through the port D1, while zeros are entered into to the two least significant positions. In the register 29, the contents of the location addressed through address port A2 are fed, through data port D2, into the four least significant bit positions of the register, while zeros are entered into the four most significant positions. The contents of the register 28 and 29 are provided to a conventional 6-bit adder 31. The contents are combined by the adder and the sum is entered into 6-bit register 33.

In operation, assume that the instantaneous value of X is 1011. According to the partition imposed upon the operand X, the two most significant bits, in group 1, are provided by way of 20, 21 to address port A1 of the memory 26. Simultaneously, the two least significant bits of X forming bit group 2 are provided to address port A2 via 23, 24. The contents of address location 10 are entered into the four most significant bit positions of the register 28, while 2 zeros are appended in the two least significant bit positions. The contents of the table location 11 are entered into the four least significant positions of register 29, while two zeros are appended by entry into the two most significant positions of the register 29. It should be evident that the interaction of the data port D1 and the register 28 effectively shifts the product of K and bit group 1 two bit positions to the left relative to the product of the two LSB's and K. Of course, left shifting a 4-bit number by two positions creates a 6-bit number, which is reflected by appending the two zeros in the most significant bit positions of the contents of the register 29. The two 6-bit numbers contained in the registers 28 and 29 are added in the digital adder 31. The sum, stored in register 33 also represents the product of X(t) and K. This can be confirmed by inspection of FIG. 3A. In FIG. 4, the decimal value of X(t) is 11. In FIG. 3A, the product of 11 and 3 (the decimal value of K) is a binary number equal to the binary number stored in the register 33 of FIG. 4.

INDUSTRIAL APPLICATION

Returning to the example of the transposed filter illustrated in FIG. 2, the principles discussed above will be applied to illustrate how the total storage size is reduced for the filter by partitioning of the multi-bit operand X. Refer now to FIG. 5 where the digital filter of FIG. 2 is implemented in N stages. In the ith stage of the filter, a 6-bit coefficient $K_j$ is multiplied by the instantaneous value of a 6-bit operand X(t). The operand X(t) is partitioned into two non-overlapping bit groups, each including three bits. The first bit group, therefore, contains the 3 MSB's of X(t), while the second bit group contains the 3 LSB's. Each of the stages of the transposed filter is equivalent, therefore, only one will be explained in detail. In stage N, partitioning of X(t) into two 3-bit groups, with no further reduction by optimization and elimination of redundancies, requires two 8-bit × 9-bit RAM's 40 and 41, each for storing all of the possible products of a 3-bit operand and the 6-bit coefficient $K_j$. Thus, eight storage locations, each 9 bits wide, are required for each of the RAMs 40 and 41. Between them, the RAMs 40 and 41 store 144 bits, representing a reduction in RAM capacity of 80% compared with the 64×12 RAM required for lookup table stored N stage n of FIG. 2.

The RAMs 40 and 41 are initially filled (by conventional means, not shown) with the output of a K products generator 42. The K products generator 42 takes the value of the coefficient for this stage, $K_n$, and generates, for each RAM, all of the possible products of $K_n$ and a 3-bit operand. These products are loaded into the RAMs 40 and 41, with each product being stored at an address location corresponding to the value of the 3-bit operand by which $K_n$ is multiplied to obtain the product. The address ports of the RAMs 40 and 41 are connected, respectively, to the 3 MSB's and 3 LSB's of X. The data ports of the RAMs 40 and 41 are connected, respectively, to the registers 44 and 45. The registers 44 and 45 are each 12 bits wide, and the register 44 receives the currently-addressed contents of the RAM 40 in its nine most significant bit positions, with zeros occupying the the three least significant positions. Similarly, the register 45 receives the currently-addressed 9-bit output of the RAM 41 in its nine least significant positions, with zeros being entered into the three most significant positions. Therefore, the contents of the RAM 40 are left-shifted by three bit positions relative to the output of the RAM 41 in order to properly align the contents for addition. In this regard, the contents of the RAMs 40 and 41 can be considered partial products which are manipulated position-wise in the registers 44 and 45 for alignment and addition in the 12-bit adder 47. The current output of the 12-bit adder 47 represents the product of the 6-bit coefficient $K_n$ and the instantaneous value of the 6-bit operand X(t).

To complete the description of the filter of FIG. 5, the product of each stage is added to the product of the next stage, with the interstage sum being registered for subsequent addition with the next product of the next stage. Relatedly, the components at the bottom of the filter in FIG. 5 constitute a pipeline for accumulation of partial results to produce the filter output Y(t). This is a conventional pipeline structure for a transposed filter and operates according to principles which are known in the art.

Figure 6:
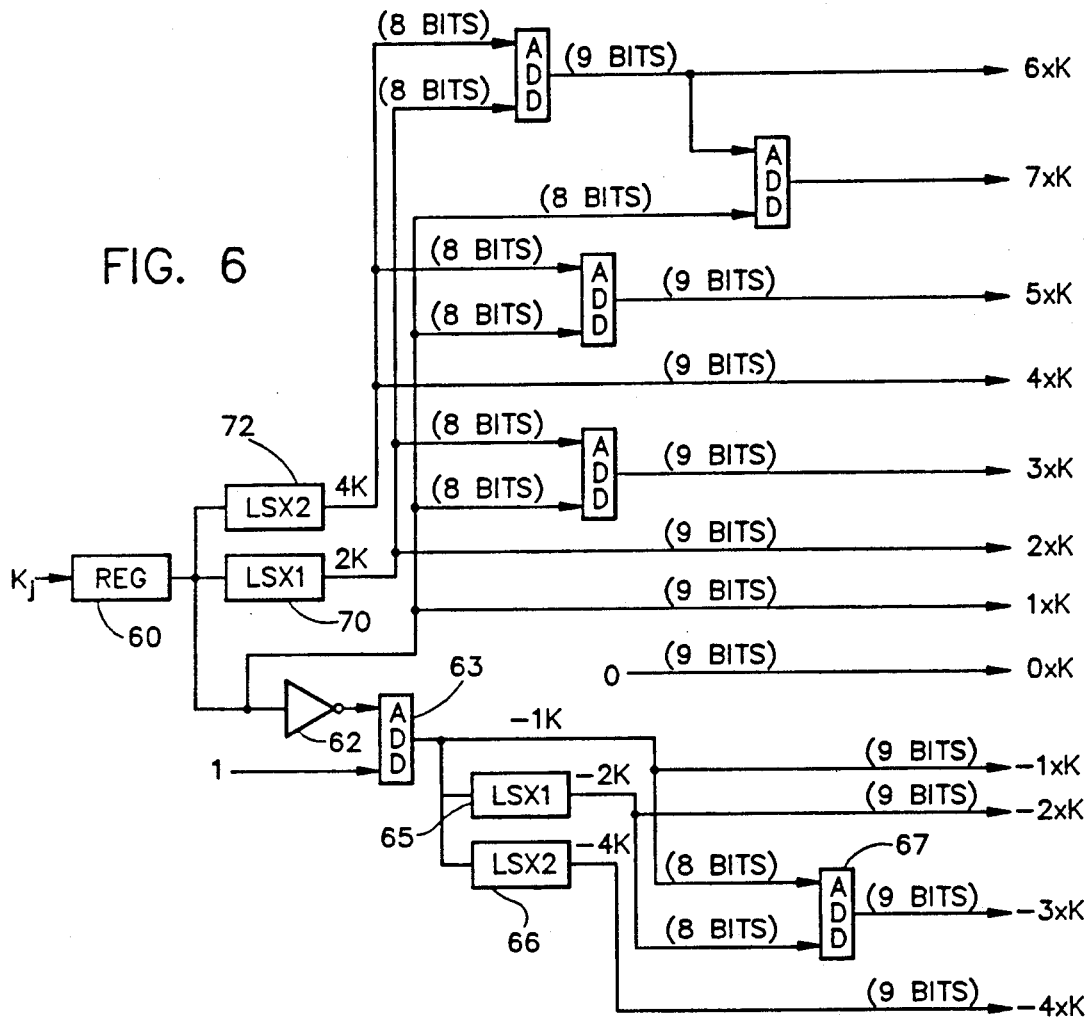
FIG. 6 is a diagrammatic illustration of a K product block of FIG. 5.

FIG. 6 illustrates the K products generator 42 for combination of a 6-bit coefficient with a 6-bit operand. In this regard, $K_j$ is registered at 60 and the necessary two's complement partial products are generated by bit-wise complementation of $K_j$ at 62, followed by addition to digital value 1 at 63. The output of the adder 63 is the two's complement representation of the product of $K_j$ and $-1$. This product is left-shifted by one bit position at 65 and by two bit positions at 66 to produce the products of $-2$ and K and $-4$ and K, respectively. The outputs of the adder 63 and the left-shift circuit 65 are added at 67 to produce the two's complement representation of the product of $-3$ and K. The positive partial products of K and a 3-bit operand are produced by left-shifting the contents of the register 60 by one bit position at 70 and by two bit positions at 72. The results are, respectively, the product of 2 and K and 4 and K. All of the possible positive non-zero products of $K_j$ and a 3-bit operand are produced by operation on the three values available at 60, 70, and 72. The partial products are 9-bit numbers which are stored in the lookup table RAMs of FIG. 5.

Figure 7:
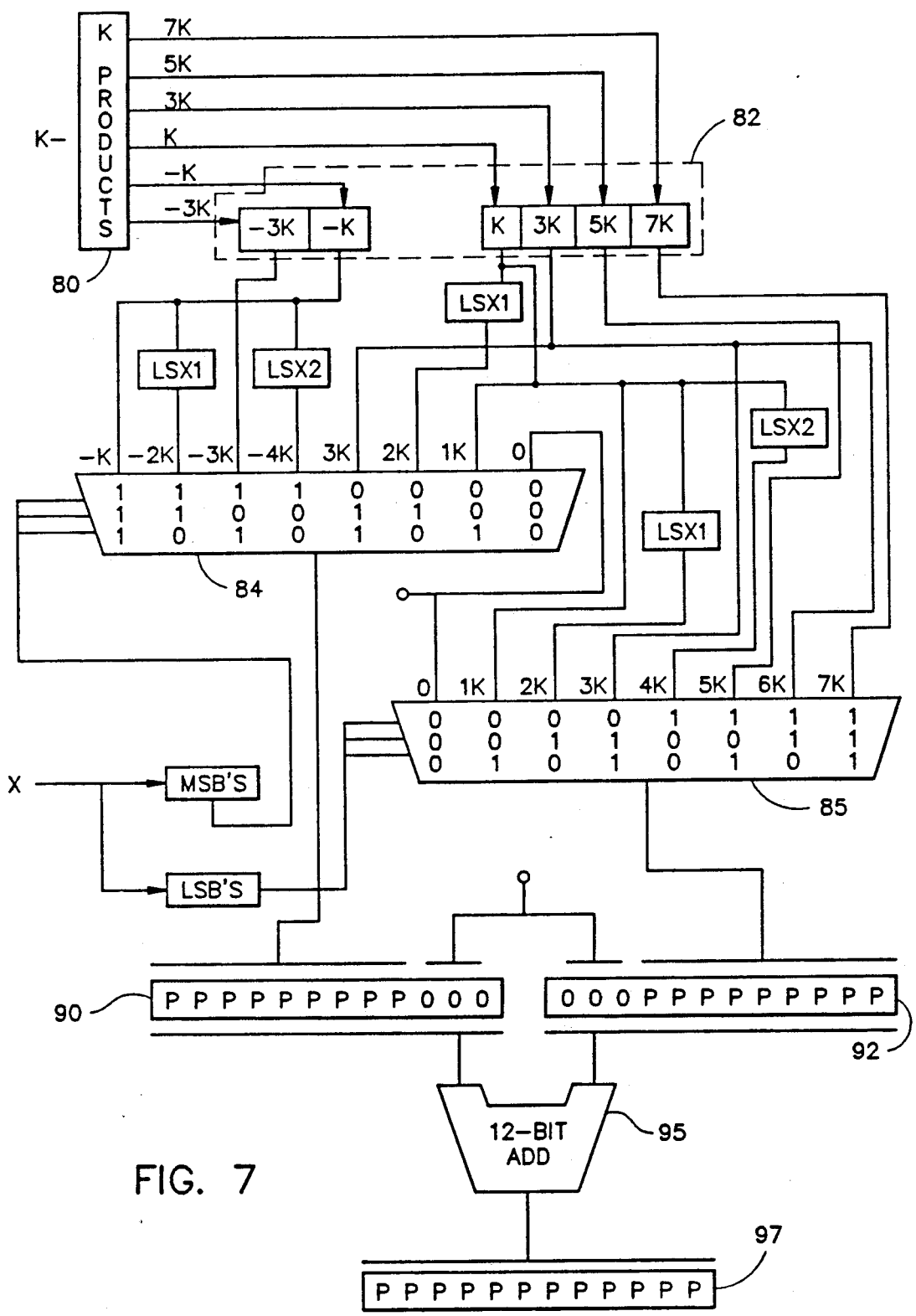
FIG. 7 is a diagrammatic illustration of a lookup multiplier which is replicated for each stage of the filter of FIG. 5.

FIG. 7 illustrates a final reduction of the storage requirement for a 6-bit coefficient and a 6-bit operand partitioned into two bit groups, each containing three bits. FIG. 7 takes advantage of the inherent redundancy of the lookup structure of FIG. 5 and also postpones the shifting operations of the K product generator of FIG. 6. In FIG. 7 a K product generator 80 receives the value of the coefficient for the stage in which the lookup table multiplier of FIG. 7 is located and produces products of K with, respectively, $-3$, $-1$, 1, 3, 5, and 7. These products are stored in a storage device, such as a register 82. The values stored in the register 82 are fed to two conventional 8-to-1 multiplexers 84 and 85. The multiplexer 84 is controlled by bit group 1 containing the three MSB's of X, while the multiplexer 85 is controlled by the three LSB's in bit group 2 of X. A respective one of the eight inputs of either of the multiplexers 84 and 85 is connected to its output in response to the instantaneous digital value of the respective bit group controlling the multiplexer. The inputs to the multiplexers 84 and 85 are configured such that the value of the selected bits corresponds to the partial product produced by the multiplication of K with the bit group value which selects the port. For example, the MSB multiplexer 84 receives the product of $-1$ and K at the port selected by 111. This corresponds to the two's complement representation of the product of 111 and K. In the MSB multiplexer 84, the ports 111, 110 and 100, are fed by shifting the value $-K$ in the register 82 by 0, 1, and 2 bit spaces, respectively. The port 101 of the multiplexer 84 is fed directly from the $-3K$ value stored in the register 82. Similarly, positive values 3K, 2K, and 1K are obtained from the values of K and 3K stored in the register 82. The product of 0 and K, that is, 00000000 is hardwired directly to port 000 of the multiplexer.

Inspection of the partial product contents of register 82 will make clear that some multiples of K do not require storage space. For example, the product of zero and K does not require a register because it is always zero. Therefore, this value is hard-wired to the 000 ports of the multiplexers 84 and 85. Further, the even multiples of K, that is, twice K and 4 times K do not require storage space since they are simply shifted versions of 1xK. In fact, all even multiples of K can be eliminated from storage. In this case, the K products generator of FIG. 6 can be easily modified to produce only odd products of K by elimination of all circuitry required to produce the products of K and $-4$, $-2$, 2, 4, and 6. This further reduces the storage requirement.

One further reduction in storage is also possible. This reduction can be understood with reference to FIG. 6 where K is received as a 6-bit operand, with the partial products generated being represented by 9 bits. Some of the products do not require 9 bits to represent. Obviously, 1xK does not require any more than 6 bits, and many of the smaller products do not require a full 9 bits for representation. Therefore, further reduction in storage and multiplexing can be enjoyed to take advantage of the more significant bits which are just the sign bit extended to cover the full product width.

The multiplexer 85 is configured to provide the value 0, K, 2K, 3K, 4K, 5K, 6K, and 7K by direct connection to the positive contents of the register 82 or by left-shifting of the K value in the register. These values are available at the ports of LSB multiplexer 85 which correspond with the 3-bit values by which K is multiplied. Thus, the value 3K is available at input 011 of the multiplexer 85.

The output of the MSB multiplexer 84 is placed into the nine most significant bit positions of 12-bit register 90, while the output of the LSB multiplexer 85 is placed in the nine least significant positions of the register 92. The contents of the register 90 are left-shifted with respect to the contents of the register 92 by placement of zeros in the three least significant positions of the register 90; zeros are also placed in the three most significant positions of the register 92. The contents of the registers 90 and 92 are added in the 12-bit adder 95. The twelve bits produced by addition of the contents of the register 90 and 92 are placed in the register 97. The contents of the register 97 are equal to the product of the 6-bit coefficient $K_n$ and the instantaneous value of 6-bit operand X.

It should be evident the practice of the invention requires memory technology affording random access to memory contents and simultaneous access by more than one port in reading table contents for bit groupings of two or more. Both functions are available in integrated circuit design by provision of additional addressing capability for a storage array. Multiple-read address schemes are also known in the art.

Furthermore, prior art multiple read and memory devices also are available which have shared addressing capability for both reading writing. These devices are necessary to the practice of the invention in providing the ability to be, first, loaded with partial products produced by a K products circuit and, second, multiply read.

I claim:

1. A method for look-up multiplication of an m-bit operand X and an l-bit operand K to reduce an n-bit product Y where $n = m + 1$ and the m bits of X are ordered in significance from $bit_1$, the most significant bit (MSB), to $bit_m$, the least significant bit (LSB), the method executable with an addressable storage apparatus and a binary adder, the method including the steps of:

partitioning X into consecutive, non-overlapping bit groups, the bit groups forming X when concatenated in a particular magnitude order in which each bit group has a respective magnitude position;

the partitioning step including partitioning X into non-overlapping bit groups, such that:

$$m = \sum_{i=1}^{G} g_i$$

where G is the number of bit groups in X, $g_i$ is the number of bits in the ith bit group, and $g_l$ is the number of bits in the bit group including the MSB, the maximum size of the bit group being the integer number of bits in the its bit group such that, $$g_i < (m/G) + 1, \text{ for all } i$$

and, either $g_1$ alone is the maximum size bit group, $g_{max}$, if $$m = g_{max} + \sum_{i=2}^{G-1} g_{max}$$

or, $g_1$ is the smallest size bit group;

generating a set of partial products for each bit group, each partial product representing the multiplication of K by a number which the bit group represents;

storing sets of partial products in the addressable storage apparatus such that each partial product of a set is stored at an address location corresponding to the number which is multiplied with K to generate the partial product said partial products including odd multiples of K;

presenting X(t) for multiplication by K, X(t) being a particular value of X;

obtaining partial products from said storage apparatus in response to X(t), each partial product obtained in response to a respective bit group of X(t) and representing the product of the instantaneous value of that bit group and K;

shifting the most significant bit groups in a predetermined magnitude direction with respect to the least significant bit group to form i n-bit partial products; and adding said i n-bit partial products.

2. The method of claim 1, wherein the step of obtaining includes shifting an odd multiple in a predetermined magnitude direction to obtain even multiples of K.

3. A lookup table multiplier for generating an n-bit number Y representing the product of an m-bit operand X and an l-bit operand K, where $n = m + 1$ and the m bits of X are ordered in significance from $bit_1$, the most significant bit (MSB), to $bit_m$, the least significant bit (LSB), comprising:

partial product means for generating a plurality of partial products, each partial product representing the product of K and a number represented by a group of consecutive bits of X, where X is partitioned into G non-overlapping groups of consecutive bits (bit groups) such that $$m = \sum_{i=1}^{G} g_i$$

where G is the number o bit groups, $g_i$ is the number of bits in he ith bit group, and $g_l$ is the number of bits in the bit group including the MSB, the maximum size of a bit group being the largest integer which is less than $(m/G) + 1$ and either $g_l$ alone is the maximum size bit group, $g_{max}$, if $$m = g_{max} + \sum_{i=2}^{G} g_{max}^{-1}$$

otherwise, $g_l$ is the smallest size bit group;

addressable storage means connected to the partial product means for storing partial products at address locations corresponding to the numbers by which K is multiplied to generate the partial products said partial products including only odd multiples of K;

a converter, connected to the addressable storage means of converting the partial products to partial products; and an adder circuit connected to the converter for adding said n-bit partial products to produce Y.

4. The lookup table multiplier of claim 3 further including means connected to the addressable storage means for generating even multiples of K in response to an odd multiple of K.

5. In a discrete multi-stage filter in which a stage result is produced at the jth stage by combining a prior stage result produced at a stage preceding the jth stage with a stage product, an improved stage architecture for the jth filter stage, the stage architecture comprising:

an adder for adding the prior stage result with a stage product to produce a jth stage result;

storage connected to he adder for providing the jth stage result to a stage succeeding the jth filter stage; and a stage multiplier connected to the adder for generating an n-bit stage product by multiplying an m-bit operand X and an 1-bit stage co-efficient K, where $n = m + 1$ and the m bits of X are ordered in significance from $bit_1$, the most significant bit (MSB), to $bit_m$, the least significant bit (LSB), including:

partial product means for generating a plurality of partial products, each partial product representing the product of K and a number represented by a group of consecutive bits of X, where X is partitioned into G non-overlapping groups of consecutive bits (bit groups) such that $$m = \sum_{i=1}^{G} g_i$$

where G is the number of bit groups, $g_i$ is the number of bits in the ith bit group, and $g_l$ is the number of bits in the bit group including the MSB, the maximum size of a bit group being the largest integer which is less than $(m/G) + 1$ and either $g_l$ alone is the maximum size bit group, $g_{max}$, if $$m = g_{max} + \sum_{i=2}^{G} g_{max}^{-1}$$

otherwise, $g_l$ is the smallest size bit group;

addressable storage means connected to the partial product means for storing partial products at address locations corresponding to the numbers by which K is multiplied to generate the partial products, said partial products including only odd multiples of K;

converter means, connected to the addressable storage means for converting the partial products to n-bit partial products; and an adder circuit connected to the converter for adding said n-bit partial products to produce said stage result.

* * * * *

UNITED STATES PATENT AND TRADEMARK OFFICE
CERTIFICATE OF CORRECTION

PATENT NO. : 5,117,385
DATED : May 26, 1992
INVENTOR(S) : Gee

It is certified that error appears in the above-indentified patent and that said Letters Patent is hereby corrected as shown below:

Column 1, line 37, please change second occurrence of "l" to --1--; and
    line 39, please change "l" to --1--.
Column 2, lines 24 and 25, please change "l" to --1--.
Column 3, line 41, please change "l" to --1--; and
    line 46, change "l" to --1--.
Column 4, line 42, please insert "1-2" over the " " in line 43.
Column 5, line 11, please change the second occurrence of "l" to --1--.
Column 11, lines 64 and 65, please change "l" to --1--.
Column 12, line 59, please change each occurrence of "l" to --1--.
Column 13, lines 7, 10, 17, please change each occurrence of "$g_1$" to
    --$g_1$--.
Column 14, line 1, please change "he" to --the--;
    lines 6 and 7, please change "l" to --1--; and
    lines 21, 24, and 31, please change each occurrence of "$g_1$" to
        --$g_1$--.

Signed and Sealed this

Fourteenth Day of December, 1993

Attest:

BRUCE LEHMAN

*Attesting Officer*     *Commissioner of Patents and Trademarks*